3,822,304
CYANO SUBSTITUTED AMIDINES
Jean-Claude Petitpierre, Kaiseraugst, and Claus Weis, Arlesheim, Switzerland, assignors to Ciba-Geigy Corporation, Ardsley, N.Y.
No Drawing. Filed Aug. 10, 1972, Ser. No. 279,409
Claims priority, application Switzerland, Sept. 3, 1971, 12,945/71; July 11, 1972, 10,361/71
Int. Cl. C07c 121/42, 121/46
U.S. Cl. 260—464  7 Claims

ABSTRACT OF THE DISCLOSURE

New N-chloro-amidines, their manufacture and utility in combating i.a. phytopathogenic fungi. The compounds correspond to the formula

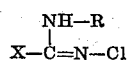

or

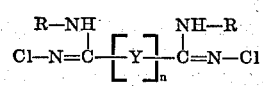

wherein R represents hydrogen, alkyl or cycloalkyl, X represents $-C \equiv N$, $-CCl_3$ or $-CCl_2-C \equiv N$, Y represents $-CCl_2-$ and $n$ represents 0 or 1.

---

The present invention relates to N-chloro-amidines, a process for their manufacture and their use in pest control. The N-chloro-amidines correspond to the formula

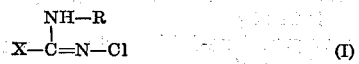 (I)

or

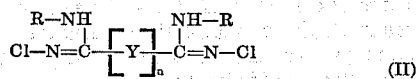 (II)

wherein R represents hydrogen, alkyl or cycloalkyl, X represents $-C \equiv N$, $-CCl_3$ or $-CCl_2-C \equiv N$, Y represents $-CCl_2-$ and $n$ represents 0 or 1.

The alkyl groups represented by R possess 1 to 6, in particular 1 to 4, carbon atoms and may be branched or straight-chain. Examples of such groups include: methyl, ethyl, propyl, isopropyl, n-, i-, sec. and tert.butyl. The cycloalkyl groups represented by R possess 3 to 8, preferably 3 to 6, ring carbon atoms. Examples of such groups include: cyclopropyl, cyclohexyl.

Preferred compounds on account of their activity are those of the formula I or II, wherein R represents hydrogen, $C_1-C_4$ alkyl, cyclopropyl or cyclohexyl, X represents $-C \equiv N$, $-CCl_3$ or $-CCl_2-C \equiv N$, Y represents $-CCl_2-$ and $n$ represents 0 or 1.

The N-chloro-amidines are manufactured by reacting the compounds of the formulae

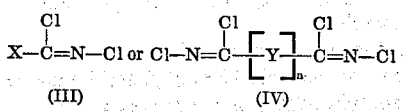

(III)  (IV)

with an amine of the formula $$H_2N-R \quad (V)$$

wherein R, X, Y and $n$ have the meanings given for formulae I and II, in the presence of an acid binding agent.

Suitable acid binding agents are tertiary amines, e.g. trialkylamines, pyridine, dialkyl anilines, inorganic bases, such as hydroxides; carbonates and bicarbonates of alkali and alkaline earth metal. The process is carried out at a temperature between 0° and 30° C., at normal pressure and in solvents or diluents.

Examples of suitable solvents or diluents are: ethers and ethereal compounds, such as diethyl ether, dioxan, dimethoxy ethane, tetrahydrofuran; amides such as N,N-dialkylated carboxylic amides; aliphatic, aromatic and halogenated hydrocarbons, in particular benzene, toluene, xylenes, chloroform, chlorobenzene; nitriles, such as acetonitriles; dimethyl sulphoxide, ketones, such as acetone, methyl ethyl ketone.

It is also possible to use water or a mixture of the above cited solvents for the reaction.

The starting materials of the formulae III and IV are known or may be manufactured by analogous methods.

The compounds of the formulae I or II have a broad biocidal activity and may be used for combating plant and animal pests of various kinds.

Preeminent, however, is the combating of representatives of the division Thallophyta, e.g. bacteria and fungi, in particular of plant pathogenic fungi in cereals, maize, rice, vegetables, vines, ornamental plants, fruit and other cultures. The compounds of the formula I are thus active against the following series of fungi:

Omycetes, Zygomycetes; Endomycetales; Aspergillales; Microascales; Protomycetales; Erysiphales, Taphrinales; Pezizales; Helotiales, Phacidiales; Sphaerialles: Clavicipitales: Myriangiales; Dothiorales; Pseudospariales; Aphyllophorales: Tremellales; Auriculariales; Uredinales and Ustilaginales.

The compounds of the formulae I and II display likewise good activity against fungi which attack the plants from the soil and partially cause trachemoycoses.

According to the invention, it is possible to treat and effectively protect against attack by fungus all kinds of seed, e.g. wheat, rye, barley, oats, maize, rice, cotton, sugar beet, vegetables; also seed potatoes, sugar cane cuttings, ground nuts or flower bulbs, whereby the combating of practically all phytopathogenic fungi and their spores, which damage seed present in the soil and lead to sever parasitic plant diseases, is made possible.

The fungicidal action of the compounds of the formulae I and II can be substantially broadened by the addition of other fungicides and adapted to the given circumstances. The following compounds are examples of suitable additives:

elementary sulphur
ammonium polysulphide and metal polysulphides
boric acid and borates
nickel sulphate
potassium chromate
copper (I) oxide (Kupferoxid)
Bordeaux broth and further inorganic and organic copper salts
bis-(tri-n-butyl tin)oxide
triphenyl tin hydroxide (Fentinhydroxid)
triphenyl tin acetate (Fentinacetat) and further organic tin compounds
methyl mercury-8-hydroxyquinolate (Ortho LM)
N-(methyl mercury)-1,4,5,6,7,7-hexachlorobicyclo[2.2.1] hept-5-ene-2,3-dicarboximide
N-(ethylmercury)-1,4,5,6,7,7-hexachlorobicyclo[2,2.1] hept-5-ene-2,3-dicarboximide
N-(ethyl mercury)-p-toluenesulphonic anilide
phenyl mercury acetate (PMA)
phenyl mercury urea
mixture of ethyl mercury-2,3-dihydroxypropyl mercaptide and ethyl mercury acetate and further inorganic and organic mercury compounds
O,O-diethyl-phthalimidiphosphonothioate
5-amino-bis-(dimethylamido)phosphinyl-3-phenyl-1,2,4-triazole (Triamiphos)
5-methylamino-bis-(dimethylamido)-phosphinyl-3-phenyl-1,2,4-triazole O,O-diethyl-O-2-pyrazinyl-phophoro thioate
O-ethyl-S,S-diphenyl-phosphorodithioate
O-ethyl-S-benzyl-phenyl phosphonodithioate
O,O-diisopropyl-S-benzyl-phosphorothioate
O-butyl-S-ethyl-S-benzyl-phosphorodithioate
O-pentachlorophenyl-bis-(dimethylamido)-phosphate
O-ethyl-S-benzyl-phenyl-phosphonate
diethylamido-benzenethiophosphonic-2-methyl-
 imidazolide
methylbromide
methyl isocyanate
1,3-dichloropropene and related halogenated $C_3$ and $C_4$
 hydrocarbons
1-chloro-2-nitro-propane
2-chloro-1-nitropropane
dichlorotetrafluoroacetone
sorbic acid and its potassium salts
dodecylguanidine acetate (dodine)
dodecylguanidine phthalate
acetylene dicarboxylic diamide
1,2-dicyano-1,2-dichloroethylene
1,2-dichloro-1-(methylsulphonyl)ethylene
1,2-dichloro-1-(butylsulphonyl)ethylene
trans-1,2-bis-(n-propylsulphonyl)ethylene
bis-(1,2-trichloroethyl)sulphoxide
bis-(n-propyl-chlorodifluoromethylthio)-sulphone
 diamide
p-dichlorobenzene
hexachlorobenzene (HCB)
1,2,4-tetrachloro-4-nitrobenzene (Tecnacen)
pentachloronitrobenzene (Quintazen)
isomer mixture of 1,3,4-trichloro-2,6-dinitrobenzene and
 1,2,3-trichloro-4,6-dinitrobenzene
2,4,5,6-tetrachloroisophthalic nitrile
2,4-dinitrophenyl-thiocyanate
diphenyl
o-nitrodiphenyl
1-chloro-2,4-dinitronaphthalene
2,4,6-trichlorophenyl
2,4,5-trichlorophenyl-chloroacetate
trichlorophenol, zinc salt
m-cresyl acetate
2,3,4,6-tetrachlorophenol
pentachlorophenol (PCP)
o-dihydroxybenzene
2,4-dioxy-n-hexylbenzene
2-phenylphenol
3,5-dibromosalicylaldehyde
2-benzyl-4-chlorophenol
2,2'-dihydroxy-5,5'-dichloro-diphenylmethane
 (Dichlorphen)
2,2'-dihydroxy-3,3',5,5',6,6'-hexachloro-diphenylmethane
2,2'-dihydroxy-5,5'-dichloro-diphenylsulphide
2,2'-dihydroxy-3,3',5,5'-tetrachloro-diphenylsulphide
disodium-2,2'-dihydroxy-3,3',5,5'-tetrachloro-diphenyl-
 sulphide
4-chloro-o-phenylphenol
1,4-dichloro-2,5-dimethoxybenzene (Chlorneb)
salicylanilide
1,2-bis-(3-methoxycarbonyl-2-thiourea)-benzene
1,2-bis-(3-ethoxycarbonyl-2-thiourea)-benzene
(3,5-dimethyl-4-chlorophenoxy)-ethanol
1,4-dichloro-2,5-dimethoxybenzene
2,4,5-trichlorophenylsulphonylmethylthiocyanate
phenylmercapto-methanesulphonamide
2-(1-methyl-n-propyl)-4,6-dinitrophenyl-2-methyl-
 crotonate (Binapacryl)
2-(1-methyl-n-propyl)4,6-dinitrophenylisopropyl-
 carbonate (Dinoeuton)
2-(1-methyl-n-heptyl)-4,6-dinitrophenylcrotonate
 (Dinocap)
methyl-2,6-dinitro-4-(1-ethyl-hexyl)phenylcarbonate+
methyl-2,6-dinitro-4-(1-propyl-pentyl)phenylcarbonate
 (Dinocton)
4-nonyl-2,6-dinitro-phenylbutyrate
S-methyl-2-(1-methyl-n-heptyl)-4,6-dinitrophenylthio-
 carbonate
1-(3,4-dichloroanilino)-1-formylamino-2,2,2-trichloro-
 ethane
2,6-dichloro-4-nitroaniline (Dichloran)
2-cyanoethyl-N-phenylcarbamate
propynyl-N-phenylcarbamate
2-methyl-benzoic anilide
2-iodo-benzoic anilide
2-chloro-benzoic anilide
2,3,5,6-tetrachloro-benzoquinone(1,4) (Chloranil)
2,3-dichloro-naphthoquinone(1,4) (Dichlon)
2-amino-3-chloro-naphthoquinone(1,4)
2-chloro-3-acetamino-naphthoquinone(1,4)
4-methyl-2,3,5,10-tetrahydro-3,5,10-trioxo-4H4-H-
 naphtho(2,3-b)-1,4-thiazine
quinoximbenzoylhydrazone (Benquinox)
N-(trichloromethylthio)phthalimide (Folpet)
N-(trichloromethylthio)cyclohex-4-ene-1,2-
 dicarboximide (Captan)
N-(1,1,2,2-tetrachloroethylthio)cyclohex-4-ene-1,2-
 dicarboximide (Captafol)
N-(1,1,2,2-tetrachloroethylthio)cyclohex-4-ene-1,2-
 dicarboximide
N'-dichlorofluoromethylthio-NN-dimethyl-N'-phenyl-
 sulphamide (Dichlofluanide)
S-(2-pyridyl-1-oxide)-S'-trichloromethyl-disulphide:
 hydrochloride
sodium-N-methyl-dithiocarbamate (Metham)
sodium-N,N-dimethyl-dithiocarbamate (DDC)
zinc-N,N-dimethyl-dithiocarbamate (Ziram)
iron-N,N-dimethyl-dithiocarbamate (Ferbam)
disodium-ethylene-1,2-bis-dithiocarbamate (Nabam)
zinc-ethylene-1,2-bis-dithiocarbamate (Zineb)
manganese (II)-ethylene 1,2-bis-dithiocarbamate
 (Maneb)
zinc-propylene-1,2-bis-dithiocarbamate (Mezineb)
 (Propineb)
complex consisting of (Maneb) and zinc (Mancozeb)
tetramethylthiuramdisulphide (Thiram)
complex consisting of (Zineb) and polyethylene thiuram-
 disulphide (Metiram)
bis-(3,4-dichloro-2(5)-furanoyl)ether (mucochloric
 anhydride)
2-methoxymethyl-5-nitrofuran
5-nitro-furfuradoxime-(2)
5-nitro-fufuryl-amidoxime-(2)
1-oxy-3-acetyl-6-methyl-cyclohexene-(5)dione(2,4)
 (dehydroacetic acid)
4,5,6,7-tetrachlorophthalide
3-[2-(3,5-dimethyl-2-oxycyclohexyl)-2-hydroxyethyl]-
 glutarimide (cycloheximide)
phthalimide
pyridine-2-thiol-1-oxide and 1-hydroxypyridine-2-thione
α,α-bis(4-chlorophenyl)-3-pyridine-methanol (Parinol)
8-hydroxyquinoline (3-Quinolinol)
8-hydroxyquinoline-sulphate (Chinosol)
benzoyl-8-hydroxyquinoline-salicylate
6-ethoxy-1,2-dihydro-2,2,4-trimethylquinoline
 (Ethoxyquin)
N-lauryl-isoquinolinium bromide
9-(p-n-hexyloxyphenyl)-10-methyl-acridinium chloride
2-n-heptadecylimidazoline acetate (Glyodin)
1-hydroxyethyl-2-heptadecylimidazoline
1-phenyl-3,5-dimethyl-4-nitrosopyrazole
1-p-chlorophenyl-3,5-dimethyl-4-nitrosoopyrazole
N-(1-phenyl-2-nitropropyl)piperazine
N,N'-bis[1-formamido-2,2,2-trichloroethyl]-
 piperazine
2-dimethylamino-6-methyl-5-n-butyl-4-hydroxy-
 pyrimidine
N-dodecyl-1,4,5,6-tetrahydropyrimidine
N-dodecyl-2-methyl-1,4,5,6-tetrahydroxypyrimidine
2-n-heptadecyltetrahydropyrimidine 1-(4-amino-4-propyl-5-pyrimidyl-methyl)-2-methyl-pyridinium-chloride hydrochloride
2-(2'-furyl)-benzimidazole (Fuberidazol)
3-dodecyl-1-methyl-2-phenylbenzimidazolium ferricyanide
methyl-n-benzimidazol-2-yl-N-(butylcarbamoyl) carbamate (Benomyl)
2-(o-chloroanilino)-4,6-dichloro-sym.triazine
2-ethylamino-6-methyl-5-n-butyl-4-hydroxypyrimidine
2,6-dichloro-3,5-dicyano-4-phenylpyridine
α-(2,4-dichlorophenyl)-α-phenyl-5-pyrimidine-methynol
5-chloro-4-phenyl-1,2-dithiol-3-one
2,3-dicyano-1,4-dithia-anthraquinone (Dithianon)
2-(4-thiazolyl)-benzimidazole
4-(2-chlorophenylhydrazono)-3-methyl-5-isoxazolone (Drazoxolon)
thiazolidinone-4-thione(2) (Rhodanin)
3-(p-chlorophenyl)-5-methylrhodanine
3,5-dimethyltetrahydro-1,3,5-thiadiazine-2-thione (Dazomet)
3,3'-acetylene-bis-(tetrahydro-4,6-dimethyl)-2H-1,3,5-thiadiazine-2-thione) (Milneb)
3-benzylidene-amino-4-phenylthiazoline-2-thione
6-chlorobenzthiazole-2-thiole, zinc salt
6-β-diethylamino-ethoxy-2-dimethylamino-benzthiazole-dihydrochloride
monoethanolammonium-benzthiazole-2-thiole
laurylpyridinium-5-chloro-2-mercaptobenzthiazole
6-(β-diethylaminoethoxy)-2-dimethylaminobenzthiazole-dihydrochloride
3-trichloromethylthiobenzothiazolone
3-trichloromethylthiobenzoxazolone
3-(trichloromethyl)-5-ethoxy-1,2,4-thiadiazole
6-methyl-2-oxo-1,3-dithiolo[4,5-b]-quinoxaline (Quinomethionat)
2-thio-1,3-dithiolo[4,5-b]-quinoxaline (Thioquinox)
2,3-dihydro-5-carboxanilido-6-methyl-1,4-oxathiine
2,3-dihydro-5-carboxanilido-6-methyl-1,4-oxathiine-4,4-dioxide
2,3-dihydro-5-carbox-o-diphenylamido-6-methyl-1,4-oxathiine
N-cyclododecyl-2,6-dimethylmorpholine acetate
N.tridecyl-2,6-dimethylmorpholine
3-(3',5'-dichlorophenyl)-5,5-dimethyloxazolidine-2,4-dione
cetyl-trimethylammonium bromide
n-alkyl($C_{12}, C_{14}, C_{16}$) dimethylbenzylammonium chloride
dialkyldimethylammonium bromide
alkyldimethylbenzylammonium chloride
alkyl $C_9$–$C_{15}$ tolylmethyltrimethylammonium chloride
p-di-isobutylphenoxyethoxyethyldimethylbenzyl-ammonium chloride
gliotoxin
2,4 - diguanidino - 3,5,6 - trihydroxycyclohexyl-5-deoxy-2-O - (2 - deoxy-2-methylamino-α-L-glucopyranoxyl)3-C-formyl-β-L-lyxopentano-furanoside (Streptomycin)
7-chloro - 4,6 - dimethoxycumaran - 3 - one-2-spiro-1'-(2-methoxy-6'-methylcyclohex-2'-ene-4'-one (Griseofulvin)
4-dimethylamino - 1,4,4a,5,5a,6,11,12a - octahydro- 3,5,6, 10,12,12a-hexahydroxy-6-methyl-1,11-dioxo-2-naphthacenecarboximide (Oxytetracyclin)
7 - chloro - 4 - dimethylamino - 1,4,4a,5,5a,6,11,12a-octahydro-3,6,10,12,12a-pentahydroxy-6-methyl-1,11-dioxo-2-naphthacenecarboximide (Chlortetracyclin)
(PIMARCIN)
(LANCOMYCIN)
(PHLEOMYCIN)
(KASUGAMYCIN)
(PHYTOACTIN)
D(—) - threo - 2,2-dichloro - N - 3 - hydroxy-a-(hydroxymethyl)-p-nitrophenethyl-acetamide (Chloramphenicol)
blasticidin-S-methyl-benzylamino-benzenesulphonate
N-(3,5-dichlorophenyl)-succinimide
N-(3,5-dichlorophenyl)-itaconimide
N-(3-nitrophenyl)-itaconimide
phenoxyacetic acid
sodium-p-dimethylamino-benzenediazosulphonate
acrolein-phenylhydrazone
2-chloroacetaldehyde-(2,4-dinitrophenyl)-hydrazone
2-chloro-3-(tolysulphonyl)-propionitrile
1-chloro-2-phenyl-pentane-diol(4,5)-thione(3)
p-nonylphenoxypolyethyleneoxyethanol iodine complex
(α-nitromethyl)-o-chlorobenzythioethylamine hydrochloride
3-(p-t.butyl-phenylsulphonyl)-acrylonitrile
octachlorocyclohexenone
pentachlorobenzyl alcohol
pentachlorobenzyl acetate
pentachlorobenzaldehyde cyanohydrin
2-norcamphane-methanol
2,6-bis-(dimethylaminoethyl)-cyclohexanone
decachloro-octahydro-1,3,4-metheno-2H-cyclobuta[cd] pentalen-2-one
1-(3-chloroallyl)-3,5,7-triaza-1-azonia-adamantane chloride The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms:
Dusts, tracking agents, granules, coated granules, impregnated granules and homogeneous granules.

Liquid forms:
(a) active substances which are dispersible in water: wettable powders, pastes, emulsions;
(b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g./litre to 600 g./litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivates (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substance and anti-foam agents and, optionally, solvents.

Wettable powder and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives mentioned above that, in wettable powder, the solid particle size of from 0.02 to 0.04 and in pasts, of 0.03 is not exceeded. To produce emulsifiable concentrates and pastes, dispersing agents such as those cited above, organic solvents and water are used. Examples of suitable solvents are the following: alcohols, benzene, xylene, toluene, dimethyl sulfoxide, and mineral oil fractions boiling between 120 and 350° C. The solvents must be practically odorless, not phytotoxic, inert to the active substances and not readily inflammable.

Furthermore, the agents according to the invention can be applied in the form of solutions. For this purpose the active substance or several active substances of the general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the formula I can, for example, be formulated as follows:

Dusts

The following substances are used to manufacture (a) a 5% and (b) a 2% dust:

(a)

5 parts of active substance
95 parts of talcum (b)

2 parts of active substance
1 part of highly disperse silica
97 parts of talcum.

The active substances are mixed with the carriers and ground.

Granules

The following substances are used to produce 5% granules:

5 parts of active substance,
0.25 parts of epichlorohydrin,
0.25 parts of cetyl polyglycol ether,
3.50 parts of polyethylene glycol,
91 parts of kaolin (particle size 0.3–0.8 mm.).

The active substance is mixed with epichlorohydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder

The following constituents are used for the preparation of (a) a 40%, (b) and (c) a 25%, and (d) a 10% wettatble powder:

(a)

40 parts of active substance,
5 parts of sodium lignin sulphonate,
1 part of sodium dibutyl-naphthalene sulphonate,
54 parts of silica acid.

(b)

25 parts of active substance,
4.5 parts of calcium lignin sulphonate
1.9 parts of Champagne chalk/hydroxyethyl cellulose mixture (1:1),
1.5 parts of sodium dibutyl naphthalene sulphonate,
19.5 parts of silica acid,
19.5 parts of Champagne chalk,
28.1 parts of kaolin.

(c)

25 parts of active substance,
2.5 parts of isooctylphenoxy - polyoxyethylene - ethanol,
1.7 parts of Champagne chalk/hydroxyethyl cellulose mixture (1:1),
8.3 parts of sodium aluminium silicate,
16.5 parts of kieselguhr,
46 parts of kaolin.

(d)

10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates

The following substances are used to produce (a) a 10% and (b) a 25% emulsifiable concentrate:

(a)
10 parts of active substance,
3.4 parts of epoxidised vegetable oil,
13.4 parts of a combination emulsifier consisting of fatty alcohol polyglycol ether and alkylarylsulphonate calcium salt,
40 parts of dimethylformamide,
43.2 parts of xylene.

(b)
25 parts of active substance,
2.5 parts of epoxidised vegetable oil,
10 parts of an alkylarylsulphonate/fatty alcohol polyglycol ether mixture
5 parts of dimethylformamide,
57.5 parts of xylene.

From these concentrates it is possible to produce, by dilution with water, emulsions of any desired concentration.

EXAMPLE 1

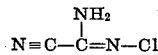

While cooling with ice, a solution of 26.6 g. (0.2 mole) of N-chloro-cyanformimidyl chloride in 50 ml. of absolute benzene is added dropwise to 300 ml. of absolute benzene which has been saturated with anhydrous ammonia. Upon completion of the dropwise addition, the reaction mixture is stirred for 1 hour at 0° C., whereupon the precipitate which has formed is filtered off. The filtrate is evaporated, in the process of which a solid product is obtained. The precipitate is dissolved in 200 ml. of distilled water and the solution is extracted with 2× 150 ml. of diethyl ether. The ether solutions are combined, dried and evaporated. The resulting product is combined with the product obtained from the filtrate and the whole is recrystallised from distilled water, to give 7.9 g. (38% of theory) of N-chloro-cyanformamidine (m.p. 110° C.).

Analysis of $C_2H_2ClN_3$. — Calculated (percent): C, 23.21; H, 1.95; Cl, 34.24; N, 40.60. Found (percent): C, 23.07; H, 1.96; Cl, 34.10; N, 40.62.

EXAMPLE 2

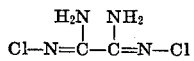

While cooling with ice, 38.8 g. (0,2 mole) of N,N'-dichloro-oxalimido chloride are slowly added dropwise to 100 g. of 25% aqueous ammonia solution. Upon completion of the addition the reaction mixture is warmed to room temperature (about 25° C.). An exothermic reaction commences which is controlled by cooling. The resulting slightly yellowish residue is filtered off after 10 minutes and recrystallised from about 1 litre of distilled water, to give 17.9 g. (58% of theory) of N,N'-dichloro-oxalimidine in the form of white crystals (m.p. 148–150° C.).

Analysis of $C_2H_4Cl_2N_4$. — Calculated (percent): C, 15.50; H, 2.60; Cl, 45.75; N, 36.15. Found (percent): C, 15.48; H, 2.72; Cl, 45.46; N, 36.46.

The compound used as starting products in Examples 1 and 2 can be manufactured, for example as follows: A mixture of 710 g. (10.0 moles) of chlorine and 130 g. (2.5 moles) of cyanogen together with 15 g. of activated charcoal is charged into an autoclave lined with tantalum and with a capacity of 1 litre. The reaction mixture is heated to 180° C. and kept for 7 hours at this temperature. The maximum pressure in the autoclave is 150 bars. Non-reacted starting materials are removed by blowing out and the reaction mixture is filtered and distilled at normal pressure.

Yield of N-cholro-cyanformamidyl chloride: 123 g. (40% of theory); b.p. 100–102° C.; mass spectrum for $C_2Cl_2N_2$:M+ calculated=122, M+ found=122.

Yield of N,N'-dichloro-oxalimido chloride: 171 g. (35% of theory); b.p. 181–184° C.; mass spectrum for $C_2Cl_4N_2$:M+ calculated=192, M+ found=192.

EXAMPLE 3

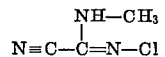

A solution of 12.3 g. (0.1 mole) of N-chloro-cyanoformimidyl chloride in 250 ml. of absolute benzene is prepared, whereupon methylamine is passed into the solution until saturation is reached. The reaction is strongly exothermic. The reaction mixture is cooled to 0° C. after 15 minutes, the precipitate filtered off and the filtrate evaporated. The resulting yellow product is taken up in water, filtered and dried, to give 5.3 g. (45% of theory) of pure N-chloro-N'-methyl-cyanoformamidine (m.p. 78–81° C.).

Analysis of $C_3H_4ClN_3$. — Calculated (percent): C, 30.66; H, 3.43; Cl, 30.16; N, 35.75. Found (percent): C, 30.57; H, 3.38; Cl, 30.15; N, 35.73.

EXAMPLE 4

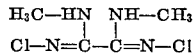

To a solution of 15.5 g. (0.5 mole) of methylamine in 50 ml. of distilled water are added dropwise at room temperature and within 10 minutes 18.6 (0.096 mole) of N,N'-dichloro-oxalimido chloride. The reaction mixture is stirred for 1 hour at room temperature, whereupon the resulting precipitate is filtered off, washed with water and dried, to give 4.5 g. (26% of theory) of N,N'-dichloro-N'-N'''-dimethyl-oxalmidine which melts at 150° C. (with decomp.).

EXAMPLE 5

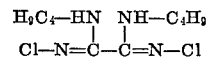

To a solution of 19.4 g. (0.1 mole) of N,N'-dichloro-oxalimido chloride in 100 ml. of diethyl ether are added dropwise at 0° C. 29.2 g. (0.4 mole) of n-butyl amine. The reaction mixture is stirred for 1 hour, whereupon the resulting precipitate is filtered off and the filtrate evaporated. The residual oil is digested with 100 ml. of cyclohexane, after which the precipitate which forms is filtered of and then dried, to give 3.2 g. (12% of theory) of N,N'-dichloro-N'',N'''-dibutyl-oxalamidine (m.p. 175° C., with decomp.).

EXAMPLE 6

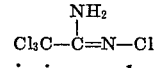

Anhydrous ammonia is passed over the course of 20 minutes into a previously prepared solution of 21.5 g. (0.10 mole) of N-chloro-trichloro-acetimido chloride in 250 ml. of diethyl ether. The resulting ammonium chloride is filtered off and the filtrate evaporated. Recrystallisation of the reaction product from cyclohexane gives 11.0 g. (56.5% of theory) of N-chloro-trichloro-acetamidine (m.p. 48–50° C.).

Analysis of $C_2H_2Cl_4N_2$.—Calculated (percent): C, 12.27; H, 1.03; Cl, 72.40; N, 14.31. Found (percent): C, 12.43; H, 1.05; Cl, 73.23; N, 14.22.

EXAMPLE 7

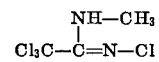

By using in Example 6 methylamine instead of anhydrous ammonia and otherwise carrying out the process as described, recrystallisation of the reaction product from cyclohexane gives 7.1 g. (35% of theory) of N-chloro-N'-methyl-trichloro-acetamidine (m.p. 80–82° C.).

Analysis of $C_3H_4Cl_4N_2$.—Calculated (percent): C, 17.17; H, 1.92; Cl, 67.56; N, 13.35. Found (percent): C, 17.29; H, 1.94; Cl, 67.32; N 13.32.

EXAMPLE 8

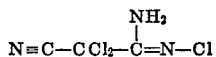

Anhydrous ammonia is passed over the course of 20 minutes into a previously prepared solution of 10.4 g. (0.05 mole) of N,2,2-trichloro-cyanacetimido chloride in 100 ml. of absolute benzene. The resulting ammonium chloride is filtered off and the filtrate evaporated. Recrystallisation of the reaction product from ligroin gives 7.5 g. (79% of theory) of N,2,2-trichloro-cyanacetamidine (m.p. 90° C.).

Analysis of $C_3H_2Cl_3N_3$.—Calculated (percent): C, 19.3; H, 1.1; Cl, 57.1; N, 22.5. Found (percent): C, 19.4; H, 1.0; Cl, 56.5; N, 22.6.

The N,2,2-trichloro-cyanacetimido chloride was manufactured by a process known in the art by chlorination of malodinitrile at 55–60° C.

EXAMPLE 9

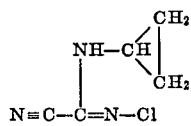

To a solution of 5.7 g. (0.10 mole) of cyclopropylamine in 100 ml. of absolute diethyl ether added dropwise at 0–10° C. and within 25 minutes 6.15 g. (0.050 mole) of N-chloro-cyanformimidyl chloride in 50 ml. of absolute diethyl ether. The reaction mixture is stirred for 1 hour at 0–10° C., after which the cyclopropylamine hydrochloride is filtered off. The filtrate is evaporated and the resulting yellow viscous product is crystallised from water, to give 4.0 g. (56% of theory) of N-chloro-N'-cyclopropyl-cyanformamidine (m.p. 72–73° C.).

Analysis of $C_5H_6ClN_3$.—Calculated (percent): C, 41.86; H, 4.22; Cl, 24.73; N, 29.29. Found (percent): C, 41.60; H, 4.14; Cl, 24.41; N, 29.15.

The following Table lists further N-chloroamidines which are manufactured analogous to the process described in Examples 1–9.

TABLE

| Compound of the formula— | Nitrogen analysis (percent) | |
|---|---|---|
| | Calculated | Found |
| NH—CH₃<br>\|<br>N≡C—CCl₂—C=N—Cl | 21.0 | 21.7 |
| H₂N    NH₂<br>\|      \|<br>Cl—N=C—CCl₂—C=N—Cl | 23.5 | 23.6 |
| H₃C—HN    NH—CH₃<br>\|      \|<br>Cl—N=C—CCl₂—C=N—Cl | 21.0 | 21.4 |
| NH—C₂H₅<br>\|<br>Cl₃C—C=N—Cl | 12.5 | 12.9 |

EXAMPLE 10

Fungicidal action (a) Action against *Botrytis cinerea* on *Vicia faba*: Fully developed, uniformly large leaves of Vivia faba, which have been sprayed dripping wet from a spraying device with an aqueous preparation (0.1% content of active substance) prepared from an active substance formulated as a 10% wettable powder, were placed three at a time in Petri dishes lined with filter paper. When the leaves were dry again, they were infected with a freshly prepared, standardised spore suspension of the fungus (concentration: 100,000 spores/ml.) and kept for 48 hours in a humid atmosphere at 20° C. After this time, the leaves displayed black, initially dot-shaped specks which rapidly spread. The number and size of the infected areas served as a yardstick for determining the effectiveness of the test substance.

The compounds according to claims 1 to 9 are active aganist *Botrytis cinerea*.

EXAMPLE 11

Action as seed-treatment solution

The applicability of the active substances according to Examples 1 to 9 for protecting parts of plants and seeds present in the soil was demonstrated after the carrying tests had been carried out.

Action against soil fungi 500 p.p.m. of active substance was worked into dry sterilised soil by throughly mixing the two. Plastic containers of 250 ml. capacity were then each filled with 100 ml. of this soil. About 10 sterilised oat seeds, which were interpenetrated with mycellium of one of each of the following fungi, were placed in each of these containers beneath the surface of the soil.

*Fusarium oxysporum, Pythium debaryum, Rhizoctonia solani*

Each of the containers was then moistened with 34 ml. of distilled water and incubated at 20–24° C. Evaluation was carried out after 5 days in order to determine whether mycelia were growing into the surrounding soil from the seeds.

Action against seeds attacked by fungi

Wheat seeds were artificially infected with the fungus *Fusarium nivale*. The wheat was then treated with 200 p.p.m. of active substance and placed on moist filter paper in petri dishes. The development of mycelia was evaluated after 10 days incubation at 20–24° C.

We claim:

1. A compound of the formula

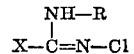

wherein R represents hydrogen, alkyl of from 1 to 4 carbon atoms or cycloalkyl of from 3 to 6 carbon atoms; and X represents CN or CCl₂CN.

2. A compound according to claim 1 in which R represents hydrogen, alkyl of from 1 to 4 carbon atoms, cyclopropyl or cyclohexyl.

3. The compound according to claim 2 of the formula

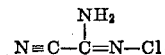

4. The compound according to claim 2 of the formula

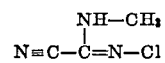

5. The compound according to claim 2 of the formula

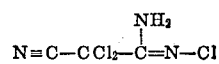

6. The compound according to claim 2 of the formula

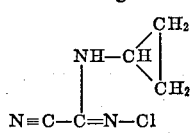

7. The compound according to claim 2 of the formula

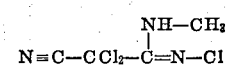

(References on following page)

References Cited

UNITED STATES PATENTS

| | | | |
|---|---|---|---|
| 3,346,554 | 10/1967 | Fuchs | 260—465.5 R X |
| 3,390,146 | 6/1968 | Nield et al. | 260—465.5 R X |
| 3,422,132 | 1/1969 | Fuchs | 260—464 |
| 3,530,162 | 9/1970 | Fuchs | 260—464 |
| 3,541,091 | 11/1970 | Zecher et al. | 260—465.5 R X |
| 3,541,132 | 11/1970 | Knowles | 260—465.5 R |
| 3,661,971 | 5/1972 | Hartter | 260—465.5 R |

JOSEPH PAUL BRUST, Primary Examiner

U.S. Cl. X.R.

260—465.5 R, 566 D; 424—304, 327